(12) United States Patent
Lee

(10) Patent No.: US 12,500,220 B2
(45) Date of Patent: Dec. 16, 2025

(54) ELECTRODE WITH BINDER LAYER FORMED THEREIN AND METHOD FOR MANUFACTURING SAME

(71) Applicant: LG ENERGY SOLUTION, LTD., Seoul (KR)

(72) Inventor: Han Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 720 days.

(21) Appl. No.: 17/633,933

(22) PCT Filed: May 3, 2021

(86) PCT No.: PCT/KR2021/005542
§ 371 (c)(1),
(2) Date: Feb. 8, 2022

(87) PCT Pub. No.: WO2021/261753
PCT Pub. Date: Dec. 30, 2021

(65) Prior Publication Data
US 2022/0293895 A1 Sep. 15, 2022

(30) Foreign Application Priority Data
Jun. 25, 2020 (KR) ........................ 10-2020-0077557

(51) Int. Cl.
*H01M 4/04* (2006.01)
*H01M 4/62* (2006.01)
*H01M 4/02* (2006.01)

(52) U.S. Cl.
CPC ......... *H01M 4/0404* (2013.01); *H01M 4/623* (2013.01); *H01M 4/625* (2013.01); *H01M 2004/021* (2013.01)

(58) Field of Classification Search
CPC ...... H01M 4/0404; H01M 4/13; H01M 4/139; H01M 4/622; H01M 4/623; H01M 4/625; H01M 2004/021
See application file for complete search history.

(56) References Cited

U.S. PATENT DOCUMENTS

2014/0079992 A1 3/2014 Tanaka
2018/0159114 A1 6/2018 Tanihara et al.
(Continued)

FOREIGN PATENT DOCUMENTS

CN 103460444 A * 12/2013 .......... H01M 10/052
CN 103548196 A 1/2014
(Continued)

OTHER PUBLICATIONS

Machine translation of JPH1173947 (Year: 1999).*
(Continued)

*Primary Examiner* — Brian R Ohara
*Assistant Examiner* — Brent C Thomas
(74) *Attorney, Agent, or Firm* — Morgan, Lewis & Bockius LLP

(57) ABSTRACT

The present invention relates to an electrode capable of preventing detachment of an active material during a notching process and a process of using the electrode, and to a method for manufacturing same, wherein the electrode has a structure in which an electrode active material layer is formed on a current collector having an electrode tab formed at one end thereof, and a binder layer is formed between the current collector and the electrode active material layer, wherein the binder layer is formed at both ends of the current collector.

15 Claims, 11 Drawing Sheets

(56) References Cited

U.S. PATENT DOCUMENTS

| | | | |
|---|---|---|---|
| 2020/0136167 A1* | 4/2020 | Park | H01M 4/662 |
| 2020/0185726 A1* | 6/2020 | Kubota | H01M 4/667 |
| 2020/0381723 A1* | 12/2020 | Hwang | H01M 4/366 |

FOREIGN PATENT DOCUMENTS

| | | |
|---|---|---|
| CN | 104518220 A | 4/2015 |
| CN | 111276668 A | 6/2020 |
| EP | 3582297 A1 | 12/2019 |
| JP | H11-031502 A | 2/1999 |
| JP | H11-073947 A | 3/1999 |
| JP | H1173947 A * | 3/1999 |
| JP | 2002-246013 A | 8/2002 |
| JP | 3482443 B2 | 12/2003 |
| JP | 4083260 B2 | 4/2008 |
| JP | 2010-250978 A | 11/2010 |
| JP | 5445871 B2 | 3/2014 |
| JP | 2014-202600 A | 10/2014 |
| JP | 2015-092463 A | 5/2015 |
| JP | 2015-230748 A | 12/2015 |
| JP | 2016-081848 A | 5/2016 |
| JP | 2016-122631 A | 7/2016 |
| JP | 2016-152170 A | 8/2016 |
| JP | 2018-198161 A | 12/2018 |
| JP | 2019-145285 A | 8/2019 |
| KR | 10-2002-0057756 A | 7/2002 |
| KR | 10-1199177 B1 | 11/2012 |
| KR | 2013-0121383 A | 11/2013 |
| KR | 2014-0132306 A | 11/2014 |
| KR | 10-2015-0045786 A | 4/2015 |
| KR | 10-2016-0010181 A | 1/2016 |
| KR | 2016-0070481 A | 6/2016 |
| KR | 10-2016-0116565 A | 10/2016 |
| KR | 10-2017-0021487 A | 2/2017 |
| KR | 2017-0055722 A | 5/2017 |
| KR | 10-2017-0092121 A | 8/2017 |
| KR | 10-2017-0093600 A | 8/2017 |
| KR | 10-1942254 B1 | 1/2019 |
| KR | 10-2019-0065172 A | 6/2019 |
| WO | 2011/013413 A1 | 2/2011 |
| WO | 2012/164642 A | 12/2012 |
| WO | 2017/154313 A | 9/2017 |
| WO | 2019/093826 A1 | 5/2019 |

OTHER PUBLICATIONS

CN103460444 merged (Year: 2013).*

Extended European Search Report issued in corresponding European Patent Application No. 21829512.9 dated Oct. 17, 2022.

International Search Report (with partial translation) and Written Opinion dated Aug. 13, 2021 issued in corresponding International Patent Application No. PCT/KR2021/005542.

Office Action dated Aug. 18, 2023 issued in the corresponding Chinese Patent Application No. 202180004738.3.

Office Action issued in corresponding Japanese Patent Application No. 2022-506938 dated Feb. 20, 2023.

Office Action issued in related Japanese Patent Application No. 2022-506938 dated Jul. 3, 2023.

Office Action issued in related European Patent Application No. 21829512.9 dated Oct. 25, 2024.

* cited by examiner

[FIG. 1]
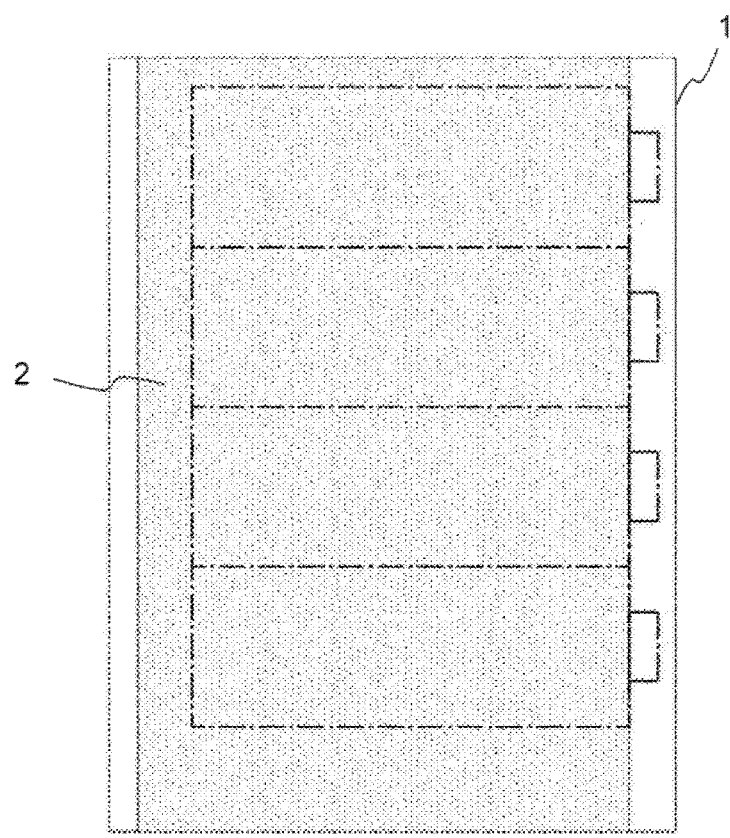

[FIG. 2]
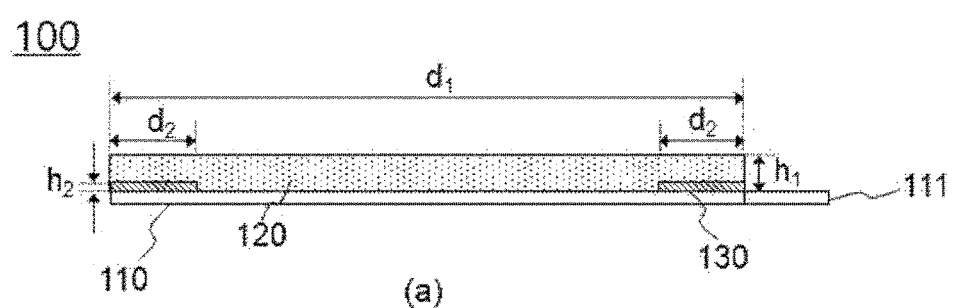
(a)
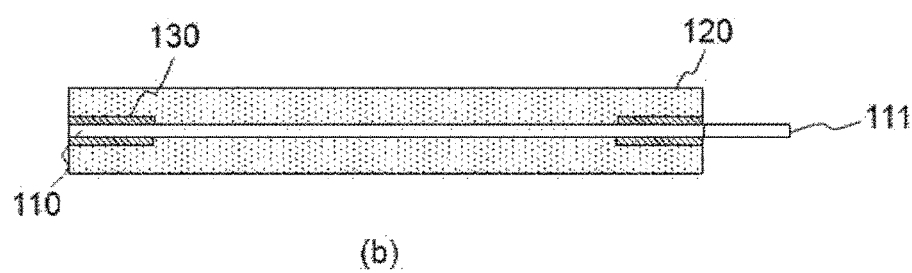
(b)

[FIG. 3]
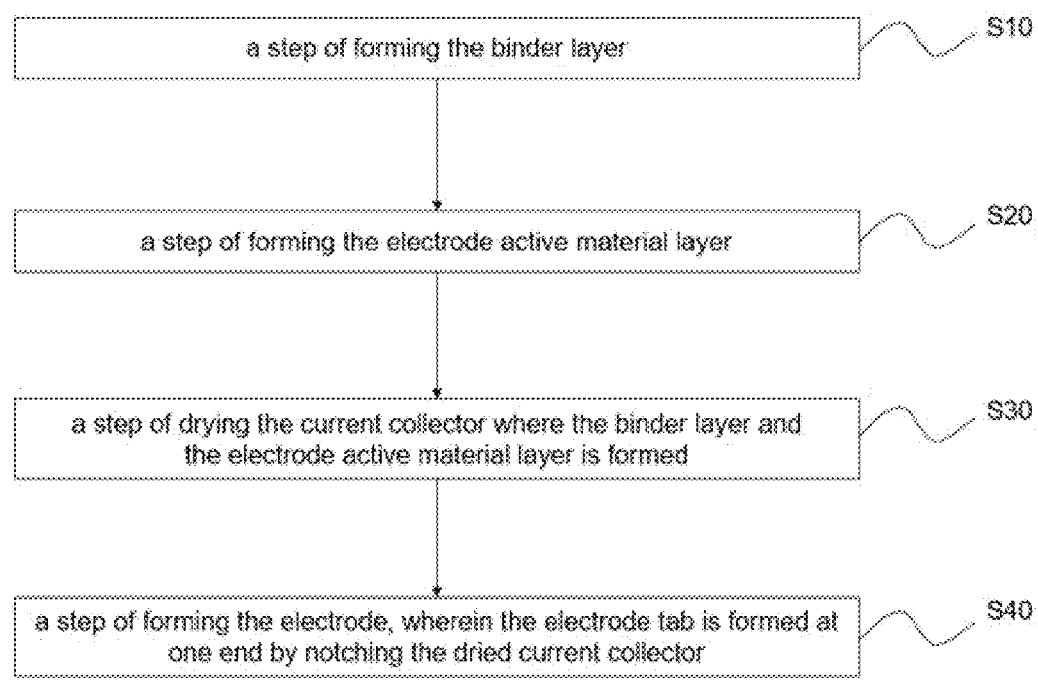

[FIG. 4]
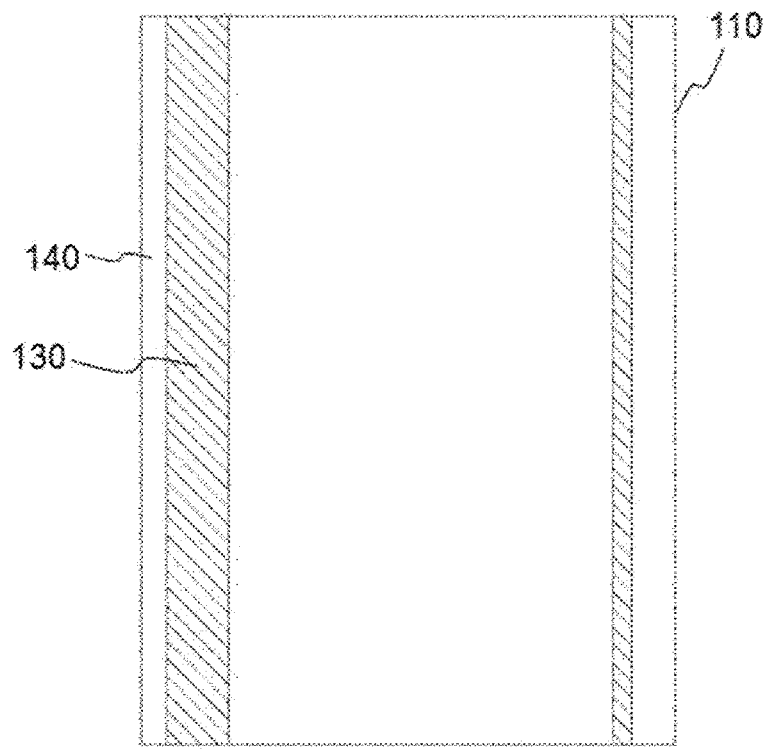

[FIG. 5]
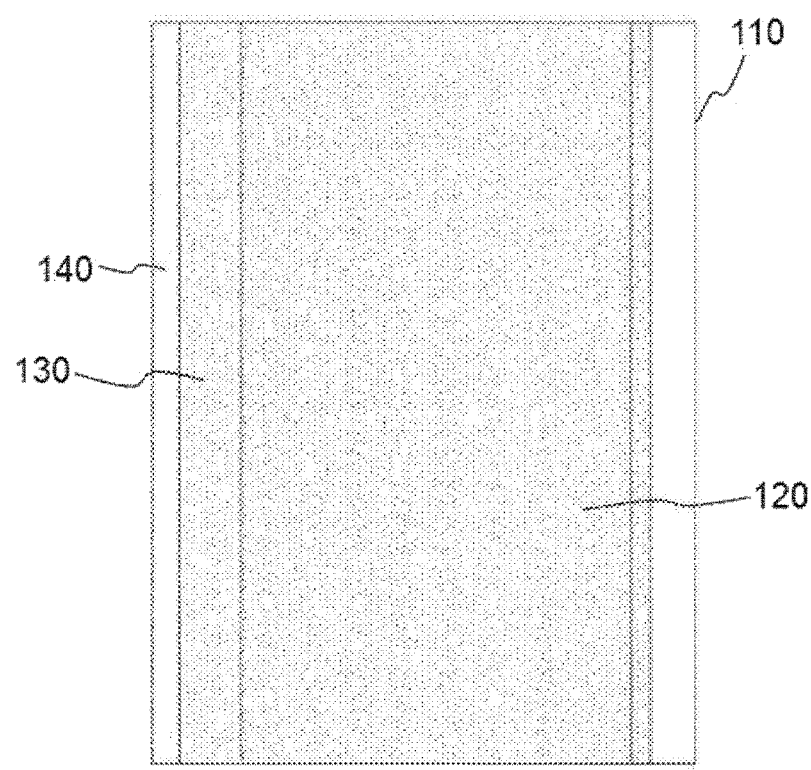

[FIG. 6]
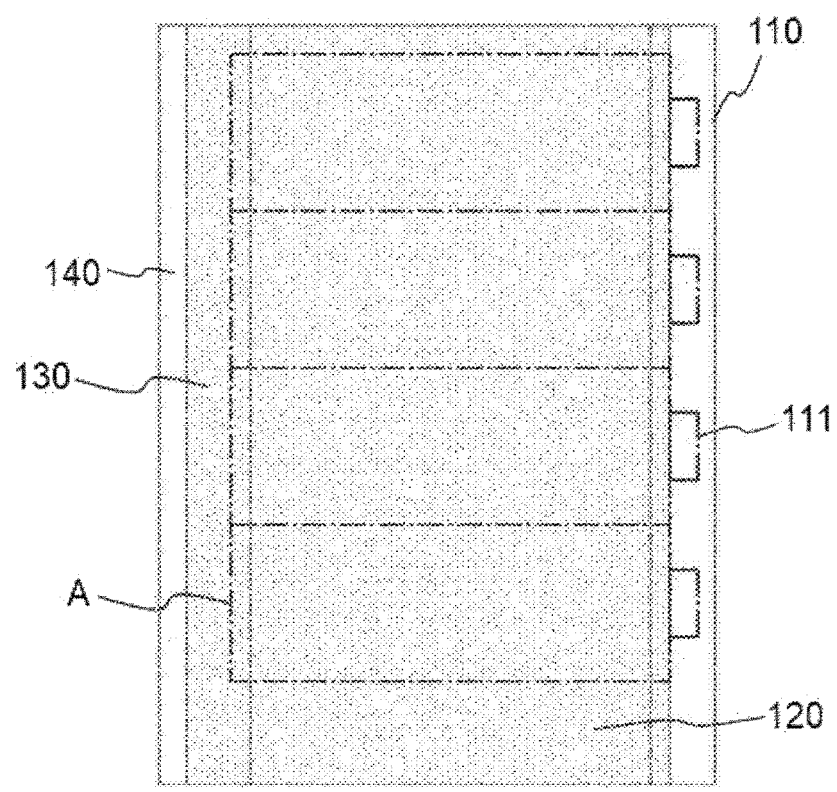

[FIG. 7]
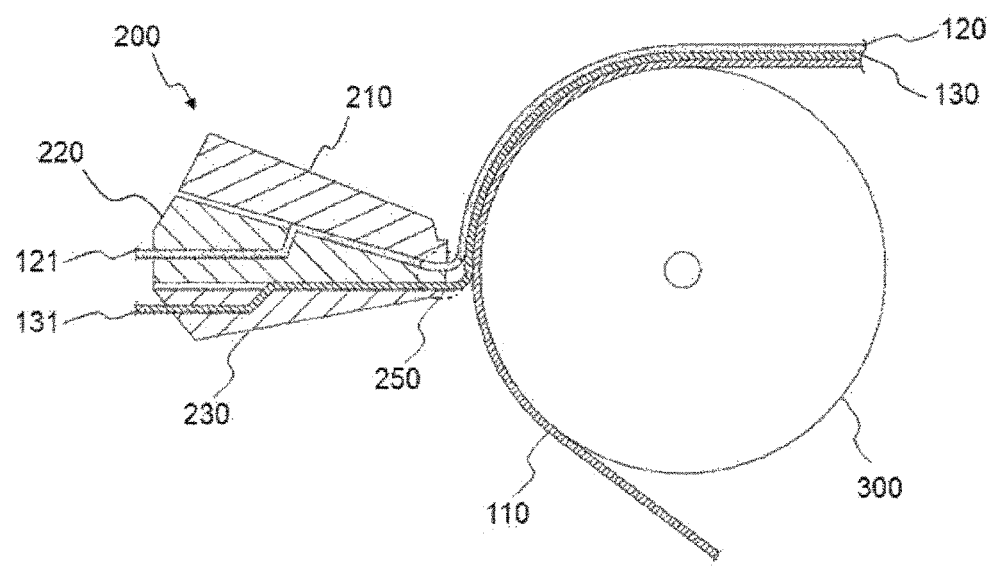

[FIG. 8]
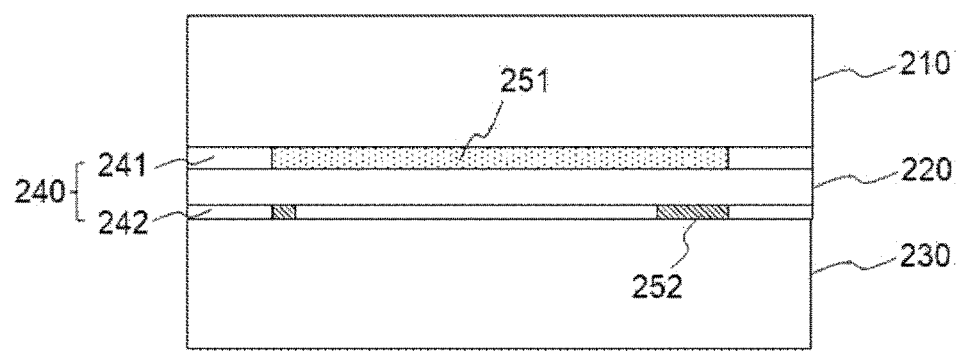

【FIG. 9】
240
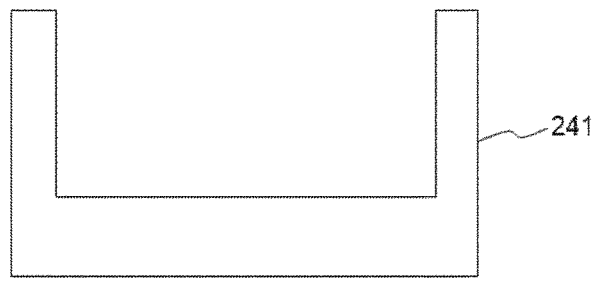
(a)
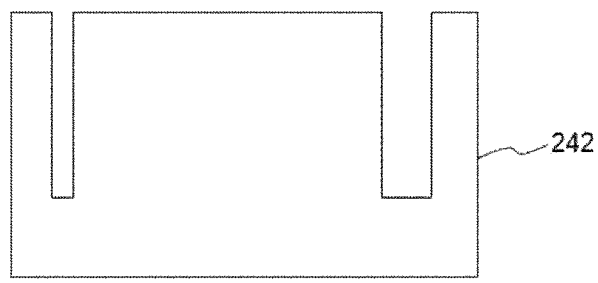
(b)

[FIG. 10]
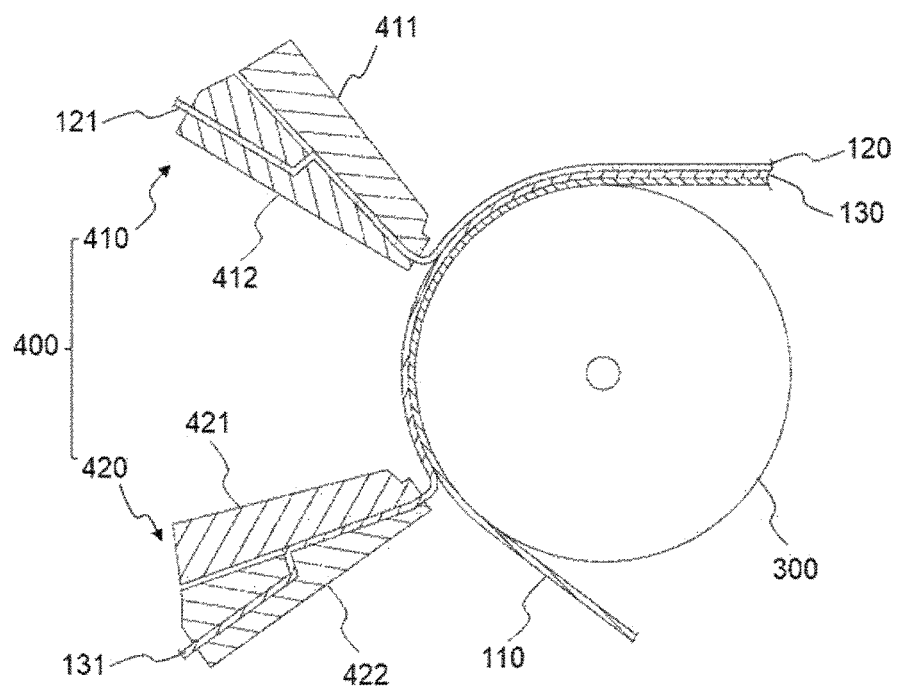

[FIG. 11]
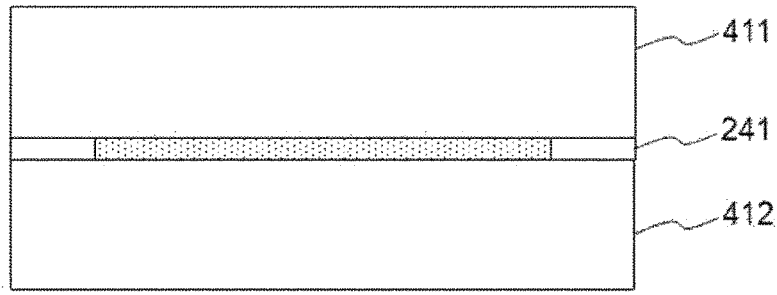
(a)
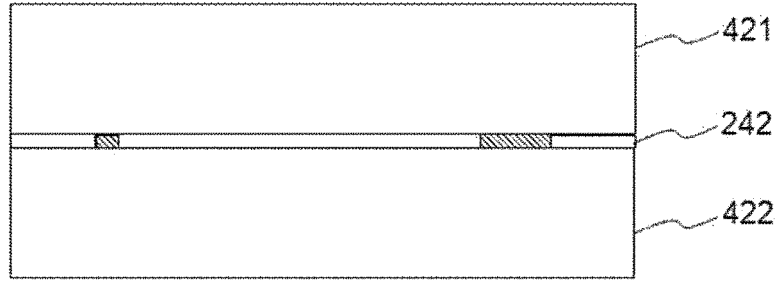
(b)

ELECTRODE WITH BINDER LAYER FORMED THEREIN AND METHOD FOR MANUFACTURING SAME

TECHNICAL FIELD

This application claims the benefit of priority based on Korean Patent Application No. 10-2020-0077557, filed on Jun. 25, 2020, and the entire contents of the Korean patent application are incorporated herein by reference.

The present invention relates to an electrode comprising binder layer and manufacturing method thereof, and more particularly, to an electrode which binder layers are formed at the bottom part of both ends of an electrode active material layer and a manufacturing method thereof.

BACKGROUND ART

Recently, chargeable and dischargeable secondary batteries are widely used as an energy source of wireless mobile devices. In addition, secondary batteries are gaining attention as an energy source of electric vehicle (EV), hybrid electric vehicle (HEV), and more, which are suggested as alternatives of the current gasoline vehicles and diesel vehicles using fossil fuels to alleviate air pollution, etc. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

Among them, due to the high capacity of the battery, larger cases and processing of thin materials have attracted attention and accordingly, the usage of a pouch-type battery in which a stacked or stacked/folded electrode assembly is embedded in a pouch-shaped battery case of an aluminum laminate sheet is gradually increasing due to low production cost, small weight, and easy shape modification.

FIG. 1 is a schematic diagram of a conventional electrode manufacturing process.

Referring to FIG. 1, an electrode slurry including an electrode active material was applied to a current collector (1) to form an electrode active material layer (2), then dried, rolled, and notched to prepare an electrode. However, the manufacturing method of an electrode cause problems such as when notching the current collector in which electrode slurry is applied, active material deintercalates at the notching part. In recent years, as the loading amount of an electrode active material increased to improve of the energy density, binder content has relatively decreased, and accordingly when notching, the deintercalation of the electrode active material may increase. In addition, in a drying process, binder moves to the surface of an electrode and it boosts deintercalatoin of the electrode active material. However, if binder content in the electrode slurry is increased to prevent this problem, energy density decreases as a result.

Therefore, technology development is needed to resolve the problem.

DISCLOSURE

Technical Problem

The present invention aims to provide an electrode, wherein during manufacturing process and procedure of the electrode, deintercalation of the electrode active material from a current collector is prevented without increasing binder content and a manufacturing method thereof.

Technical Solution

According to one embodiment of the present invention, an electrode of the present invention comprises a structure of an electrode active material layer on a current collector where electrode tabs are formed at one end, and a binder layer is formed between the current collector and the electrode active material layer, and the binder layer is formed at both ends of the electrode active material layer.

According to one embodiment of the present invention, the binder layer includes 60 to 90 wt % of binder and 10 to 40 wt % of conductive material based on a binder layer weight.

According to one embodiment of the present invention, thickness of the binder layer is 1 to 30% of thickness of the electrode active material layer.

In this case, sum of the thickness of the electrode active material layer and the thickness of the binder layer at both ends of the current collector is the same with the thickness of a portion of the electrode active material layer where binder layer is not formed.

According to one embodiment of the present invention, width direction length of the binder layer formed at one end of the current collector is 5 to 20% of width direction length of the electrode active material layer.

In addition, the present invention provides a secondary battery comprising the aforementioned electrode.

The present invention provides a method of manufacturing electrode comprising a step of forming the binder layer by applying a binder composition including binder in two rows on the current collector; a step of forming the electrode active material layer by applying an electrode slurry including the electrode active material on the current collector where the binder layer is formed at both ends of the active material layer based on a coating width direction and the collector is completely covering the binder layer; a step of drying the current collector where the binder layer and the electrode active material layer is formed; and a step of forming the electrode wherein the electrode tab is formed at one end by notching the dried current collector.

In the step of forming the binder layer, a width length of one of the binder layers formed in two rows is lower than a width length of another one.

In the step of forming the binder layer, at each of the exterior of the binder layers in two rows, non-coated parts are formed based on width direction of the current collector.

In the step of forming the electrode, the electrode tabs are formed at one of the non-coated parts.

In this case, the electrode tabs may be formed at one of the binder layer with lower width direction length among the binder layers in two rows.

In the step of forming the electrode, the binder layer with longer width direction length is notched to the same length of another one of the binder layers in two rows of the current collector.

According to one embodiment of the present invention, the step of forming the binder layer and forming the active material layer are simultaneously conducted by one slot die.

According to the other embodiment of the present invention, the step of forming the binder layer and forming the active material layer are conducted consecutively by two slot dies.

In addition, the present invention includes the method of manufacturing secondary battery comprising the method of manufacturing electrode.

Advantageous Effects

The electrode according to the present invention can prevent deintercalation of the electrode active material by forming the binder layer between the current collector and the electrode active material layer at both ends, and accordingly prevent a low voltage problem.

In addition, the manufacturing method of the electrode according to the present invention prevents deintercalation of the active material from the current collector during the notching process of the current collector by applying the binder composition to both ends of where the electrode slurry will be applied, beforehand of applying electrode slurry including the electrode active material.

BRIEF DESCRIPTION OF THE DRAWINGS

FIG. 1 is a schematic diagram illustrating a conventional electrode manufacturing process.

FIG. 2(a) and FIG. 2(b) are schematic diagrams showing a structure of an electrode according to one embodiment of the present invention.

FIG. 3 is a flow chart illustrating steps of the manufacturing method of the electrode.

FIG. 4, according to the manufacturing method of the electrode of the present invention, is a schematic diagram of the shape of binder composition applied to the current collector.

FIG. 5, according to the manufacturing method of the electrode of the present invention, is a schematic diagram illustrating a shape of electrode slurry including electrode active material applied to the current collector where the binder composition is applied.

FIG. 6, according to the manufacturing method of the electrode of the present invention, is a schematic diagram of a notching process of the current collector where the binder composition and electrode slurry are applied.

FIG. 7, according to one embodiment of the electrode of the present invention, is a schematic diagram of illustrating an application process of the binder composition and electrode slurry.

FIG. 8 is a schematic diagram showing a structure of a slot die used in one embodiment of the electrode of the present invention.

FIG. 9 is a schematic diagram illustrating a shape of a shim member embedded in slot die used in the other embodiment of the electrode of the present invention.

FIG. 10 is a schematic diagram showing an application process of the binder composition and electrode slurry of the manufacturing method of the electrode according to one embodiment of the present invention.

FIG. 11 is schematic diagram illustrating a structure of slot die used in the manufacturing method of the electrode according to one embodiment of the invention.

DETAILED DESCRIPTION OF THE PREFERRED EMBODIMENTS

Hereinafter, the present invention will be described in detail. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail.

FIG. 2 is a schematic diagram showing a structure of an electrode according to one embodiment of the present invention.

Referring to FIG. 2, the electrode (100) according to the present invention has a structure of the electrode active material layer (120) formed on the current collector (110) where the electrode tab (111) is formed at one end and the binder layer (130) formed between the current collector (110) and electrode active material layer (120), and the binder layer (130) formed on both ends of the electrode active material layer (120).

In the context of the present invention, the electrode active material layer means the layer formed by the application of the electrode slurry on the current collector and the binder layer means the layer formed by the application of the binder composition on the current collector.

In this case, the binder layer (130) and the electrode active material layer (120) can be formed at one side or both sides of the current collector (110). Referring to FIG. 2, FIG. 2(a) shows the electrode, wherein the binder layer (130) and the electrode active material layer (120) are formed at one side of the current collector (110), and FIG. 2(b) shows the electrode, wherein the binder layer (130) and the electrode active material layer (120) are formed at both sides of the current collector (110).

As described above, when notching, a problem of deintercalation of the electrode active material layer happened in the manufacturing method of the electrode as the electrode slurry including the electrode active material was applied on the current collector and dried, rolled, and notched to prepare the electrode. In addition, during the use process of the electrode, a problem of deintercalation of the active material was present as the end of the electrode easily worn out.

Accordingly, by forming the binder layer (130) between the electrode active material layer (120) and the current collector (110), adhesion of the current collector to the active material can be improved during the manufacturing process and use process of the electrode and deintercalation of the current collector and active material can be prevented. Accordingly, deterioration of the performance of the battery such as cycling characteristics can be prevented during the manufacturing process and use process of the electrode.

In addition, the present invention forms the binder layer at a part of the current collector except the entire surface of the current collector and in this case, the binder layer may act as an electric resistance to prevent the decrease of conductivity between the electrode active material layer and the current collector. The electrode according to the present invention can improve the performance of the battery by securing the maximum conductivity between the electrode active material layer and the current collector as a result of forming the binder layer only at both ends of the electrode active material layer.

Hereinafter, the present invention will be described in detail.

According to the electrode of the present invention, the current collector can be formed of a conductive member made of a metal having good conductivity. The current collector is not particularly limited as long as it has conductivity without causing chemical change in the battery. When the electrode for a lithium secondary battery is a positive electrode, the electrode current collector is, for example, stainless steel, aluminum, nickel, titanium, sintered carbon or aluminum or stainless steel surface-treated with carbon, nickel, titanium or silver. In addition, fine unevenness can be formed on the surface of the collector to increase the adhesive force of the electrode coating layer. The current collector may be used in various forms such as a film, a sheet, a foil, a net, a porous body, a foam, and a nonwoven fabric, and may have a thickness of 3 to 500 μm.

When the electrode is a negative electrode, the examples include copper, stainless steel, aluminum, nickel, titanium, sintered carbon, or stainless steel surface-treated with carbon, nickel, titanium, silver or the like, aluminum-cadmium alloy, or the like. The current collector of the negative electrode may have a thickness of 3 to 500 μm.

On the other hand, the electrode active material layer may include an electrode active material, a conductive material, and a binder. The electrode active material may be a positive electrode active material or a negative electrode active material, and the positive electrode active material may be lithium-containing oxides, and maybe the same or different. As the lithium-containing oxide, a lithium-containing transition metal oxide may be used.

For example, the lithium-containing transition metal oxide is $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3). It may be any one selected from or a mixture of two or more of them, and the lithium-containing transition metal oxide may be coated with a metal or metal oxide such as aluminum (Al). Further, in addition to the lithium-containing transition metal oxide, sulfide, selenide, halide, or one or more of them may be used.

The negative electrode may include a carbon material, lithium metal, silicon or tin. When a carbon material is used as the negative electrode active material, both low-crystalline carbon and high-crystalline carbon may be used. Typical low crystalline carbons include soft carbon and hard carbon, and high crystalline carbons include natural graphite, kish graphite, pyrolytic carbon, and liquid crystal pitch-based carbon fiber. High-temperature calcined carbons such as mesophase pitch based carbon fiber, mesocarbon microbeads, mesophase pitches, and petroleum orcoal tar pitch derived cokes are typical.

The conductive material is usually added in an amount of 1 wt % to 30 wt % based on the total weight of the mixture including the cathode active material. Such a conductive material is not particularly limited as long as it has electrical conductivity without causing chemical changes in the battery, for example, graphite such as natural graphite or artificial graphite; Carbon black such as carbon black, acetylene black, ketjen black, channel black, furnace black, lamp black, and summer black; Conductive fibers such as carbon fiber and metal fiber; Metal powders such as carbon fluoride, aluminum, and nickel powder; Conductive whiskey such as zinc oxide and potassium titanate; Conductive metal oxides such as titanium oxide; Conductive materials such as polyphenylene derivatives and the like can be used.

The binder is a component that assists in bonding of the active material and the conductive material and bonding to the current collector, and is usually added in an amount of 1 to 30 wt % based on the total weight of the mixture containing the cathode active material.

The binder is a water-insoluble polymer which is soluble in an organic solvent and insoluble in water or an aqueous polymer which is insoluble in an organic solvent and soluble in water. Examples of the water-insoluble polymer include polyvinylidene fluoride (PVDF), polyvinylidene chloride (PVDC), polyacrylonitrile (PAN), polypropylene oxide (PPO), polyethylene oxide-propylene oxide copolymer (PEO-PPO), polytetrafluoroethylene (PTFE), polyimide (PI), polyetherimide (PEI), Stylenebutadiene rubber (SBR), polyacrylate, or one or more of them and/or derivatives thereof may be used.

Examples of aqueous polymer include carboxymethyl cellulose (CMC), methyl cellulose (MC), cellulose acetate cellulose (CAP), hydroxypropyl methyl cellulose (HPMC), hydroxypropyl methyl cellulose phthalate (HPMCP), or one or more of them and/or various cellulose derivatives such as the aforementioned.

On the other hand, the binder layer may include a binder and a conductive material. The binder and the conductive material may use the binder and conductive material used in the aforementioned active material, and the same kind or the different kind of these maybe used.

The binder layer, based on the weight of the binder layer, may include 60 to 90 wt % of the binder, and particularly 70 to 80 wt % of the binder. Accordingly, based on the weight of the binder layer, the conductive material may be included 10 to 40 wt %, and more particularly 20 to 30 wt %. When the contents of the binder and conductive material are in the aforementioned range, adhesion of the electrode active material layer and the current collector can be improved and minimization of the resistance in the electrode can be achieved. When the binder content is lower than 60 wt % and the conductive material content is above 40 wt %, the electrode active material may deintercalate since the lack of binder content. On the other hand, when the binder content is above 90% and the conductive material content is lower than 10%, the lack of the conductive material content may increase resistance in the electrode.

Referring to FIG. 2, thickness ($h_2$) of the binder layer (130) may be 1 to 30% of thickness ($h_1$) of the electrode active material layer (120), particularly 1 to 20%, and more particularly 1 to 10%. In this case, the thickness ($h_1$) of the electrode active material layer (120) means thickness of the electrode active material layer (120) in the direct contact with the current collector (110). The purpose of it is to maximize the electrode capacity by minimizing the volume of the binder layer (130) and maximizing the volume of the electrode active material layer (120). When the thickness of the binder layer (130) is lower than 1% of the thickness of the electrode active material layer (120), the volume of the binder layer (130) maybe too little to prevent deintercalation of the active material. When the thickness of the binder layer (130) is thicker than 30% of the thickness of the electrode active material layer (120), as the increasing amount of the thickness of the binder layer (120) on the surface of the electrode active material layer (130), a forming step also increases. This is not desirable because the volume becomes larger when manufacturing the electrode assembly. If the thickness of the electrode active material layer (120) is modulated to have flat top surface on the electrode active material layer (120) as described below, the volume of the electrode active material layer (120) decreases as much as the volume of the binder layer (130), when the binder layer (130) is too thick. Therefore, the problem of the decrease of the capacity of the electrode is present.

According to the electrode of the present invention, the sum of the thickness of the electrode active material layer (120) and the binder layer (130) at the both ends of the current collector (110) is the same with the thickness of the electrode active material layer (120) where the binder layer (130) is not formed. As described above, this is to prevent the step forming by modulating the thickness of the electrode active material layer (120) and evening the top surface of the electrode active material layer (120). If a step forms on the top surface of the electrode active material layer (120) because of the binder layer (130), the step may lead to a space forming between the separator and the electrode and may increase the volume of the electrode assembly.

Referring to FIG. 2, width direction length ($d_2$) of the binder layer (130) formed at one end of the current collector maybe 5 to 20% of width direction length ($d_1$) of the electrode active material layer (120), and specifically, 5 to 10% of range. In this case, the width direction length is a direction perpendicular to the direction (the conveying direction of the current collector, hereinafter referred to as the coating direction) in which coating is directed when the binder layer is coated. The width direction corresponds to the direction in which the electrode tabs are drawn out.

When the width direction length of the binder layer (130) is lower than the aforementioned range, deintercalation of the active material may occur when manufacturing and using the electrode. When the width direction length of the binder layer (130) is above the aforementioned range, area in which the electrode active material layer (120) is in direct contact with the current collector (110) may decrease and the capacity of the electrode may decline as the volume of the electrode active material layer (120) decrease as much as the volume of the binder layer (130).

The present invention provides a secondary battery including the aforementioned electrode.

The secondary battery is housing an electrode assembly in which a positive electrode, negative electrode, and a separator are alternatively stacked inside an electrode case. In this case, at least one of the positive electrode and the negative electrode has binder layer formed at both ends of the active material layer. In addition, the shape of the electrode assembly is not particularly limited as long as it includes the separator between the positive electrode and the negative electrode, the positive electrode, and the negative electrode, and may be, for example, a jelly-roll type, a stack type, or a stack-fold type.

The battery case is not particularly limited as long as it is used as an exterior material for packaging the battery, and a cylindrical, square, or pouch type may be used. However, specifically, the battery cell maybe the pouch-shaped battery cell. In case of the pouch-shape battery cell, the battery case is made of an aluminum laminate sheet, provides a space for accommodating the electrode assembly, and has a pouch shape as a whole. The pouch-shape secondary battery is manufactured through a process of heat-sealing the outer circumferential surface of the battery case, in which the electrode assembly is embedded in the storage portion of the battery case, the electrolyte is injected, and the upper pouch and the lower pouch of the battery case are in contact. Other contents related to the pouch-shape secondary battery are well known to those skilled in the art and are not described in detail here.

In addition, the present invention provides the manufacturing method for the electrode as described above.

FIG. 3 is a flow chart illustrating steps of the manufacturing method of the electrode.

Referring to FIG. 3, the method of manufacturing the electrode according to the present invention includes a step of forming the binder layer by applying a binder composition including binder in two rows on the current collector (S10); a step of forming the electrode active material layer by applying an electrode slurry including the electrode active material on the current collector where the binder layer is formed at both ends of the active material layer based on a coating width direction and the collector is completely covering the binder layer (S20); a step of drying the current collector where the binder layer and the electrode active material layer is formed (S30); a step of forming the electrode, wherein the electrode tab is formed at one end by notching the dried current collector (S40).

The manufacturing method of the electrode according to the present invention prevents deintercalation of the active material from the current collector during the notching process of the current collector by applying the binder composition to both ends of where the electrode slurry will be applied, beforehand of applying electrode slurry including the electrode active material.

FIG. 4, according to the manufacturing method of the electrode of the present invention, is a schematic diagram of the shape of binder composition applied to the current collector and FIG. 5, according to the manufacturing method of the electrode of the present invention, is a schematic diagram illustrating a shape of electrode slurry including electrode active material applied to the current collector where the binder composition is applied. FIG. 6, according to the manufacturing method of the electrode of the present invention, is a schematic diagram of a notching process of the current collector where the binder composition and electrode slurry are applied.

Referring to FIG. 4 to FIG. 6, according to the manufacturing method of the electrode of the present invention, the binder layer (130) is initially formed by applying the binder composition including the binder and conductive material on the current collector (110). The binder and conductive material are as defined as above. The binder composition is formed when the binder and conductive material are dispersed in a solvent such as N-methyl-pyrrolidone (NMP), prepared in a paste-like mixture, and applied via application device. The binder layer (130) has a structure that is spaced apart at predetermined intervals, and for example it can be formed by application to two rows.

In one example, the width length of one of the binder layers (130) formed in two rows is lower than the width length of another one. In this case, the width direction length of the binder layer with relatively shorter width direction length should be the same with the width direction length of the binder layer which forms at the finally produced electrode. As will be described below, this is because electrode tabs should be formed adjacent to the binder composition with shorter width length. On the other hand, the width direction length of the binder layer having a relatively long length is formed longer than the width direction length of the binder layer which forms at the finally produced electrode. The binder layer having a relatively long length is punched to the width direction length of binder layer which forms at the finally produced electrode in the notching process. This is to prevent deintercalation of the electrode active material at the electrode slurry on top of the binder composition by directly punching the binder layer which formed on the current collector during the notching process.

In this case, to form the non-coated part (140) at each of the exterior of the binder layer in two rows based on the width direction of the current collector (110), the binder layer (130) is formed in two rows at a certain portion apart from the edge of the current collector (110) based on the width direction. As will be described below, this is to form the electrode tab (111) in the notching process.

When the binder layer (130) is formed on the current collector (110), the electrode active material layer (120) forms as the electrode slurry (121) is applied on the current collector. Like the binder layer (130), the electrode active material layer (120) is formed by applying the electrode slurry in a paste-like mixture after the conductive material and the binder are dispersed in a solvent. In this case, the electrode active material layer (120) is applied to completely cover the binder layer (130), and accordingly the binder layer (130) is placed at both ends of the electrode active material layer (120) between the current collector and the electrode active material layer (120).

When the electrode active material layer (120) is formed, it can have a desirable thickness after it is dried to remove the solvent and rolled.

In the step of forming the electrode, the dried current collector (110) can be manufactured into the unit electrode (A) in which the electrode tab (111) is formed at one end via notching process.

In this case, the electrode tab (111) is formed at one of the non-coated parts (140) formed at the exterior of the binder layer (130) formed in two rows based on the width direction.

The electrode tab (111), for example, can be formed adjacent to the binder layer with shorter width direction length among the binder layers (130) formed in two rows.

In addition, in the step of forming the electrode, the binder layer with longer width direction length is notched to the same length of another one among the binder layers in two rows of the current collector. Accordingly, an electrode having a binder layers (130) formed in the same width direction length at both ends can be obtained.

The binder layers (130) formed in two rows during the notching process maybe notched in a way that the two layers having the same width direction lengths. However, the width direction lengths of the binder layers may differ according to the desirable performance of the electrode.

On the other hand, for example, the step of forming the binder layer and the step of forming the electrode active material layer maybe performed by slot die coating method.

FIG. 7, according to one embodiment of the electrode of the present invention, is a schematic diagram of illustrating an application process of the binder composition and electrode slurry and FIG. 8 is a schematic diagram showing a structure of a slot die used in one embodiment of the electrode of the present invention. FIG. 9 is a schematic diagram illustrating a shape of a shim member embedded in slot die used in the other embodiment of the electrode of the present invention.

Referring to FIG. 7 to FIG. 8, the step of forming the binder layer and the electrode active material layer maybe simultaneously performed by one slot die.

In this case, the slot die (200) has a structure of having two discharge ports (250) in order to simultaneously discharge binder composition (131) and electrode slurry (121).

For slot die (200), when two discharge ports (250) are formed, the shape of the slot die is not particularly limited. However, for example, the slot die (200) has a structure of an upper die (210), intermediate die (220), and a lower die (230) sequentially fastened. The first discharge port (251) is formed between the interface of the upper die (200) and the intermediate die (220) to discharge the electrode slurry (121). Interface between the intermediate die (210) and lower die (230) may has a structure of the second discharge port (252) discharging the binder composition (131). For example, the upper die (210), intermediate die (220), and the lower die (230) may be coupled by fastening bolt.

In addition, in the present invention, in order to apply the binder composition (131) on the current collector (110) and then to directly coat the electrode slurry (121), the second discharge port of which the binder composition (131) is discharged should be located on the upstream point of the first discharge port of which the electrode slurry (121) is discharged based on the transport direction of the current collector.

In addition, referring to FIG. 7, the slot die (200) is located on one side of the current collector (110) and discharge the binder composition (131) and electrode slurry (121) via discharge port (250). On the other side of the current collector (110) adjacent to the slot die (200) is a conveyor (300). The conveyor (300) transports the current collector (110) and supports the current collector (110), so that the current collector (110) can be coated with the electrode slurry and the binder composition.

The electrode slurry and binder composition are formed by mixing raw materials constituting them, and filtered to increase the dispersion degree via sieve or filter or etc., then transported to the slot die (200). The electrode slurry and binder composition transported to the slot die (200) via manifold (not shown) where slurry delivery tube (not shown) and supplied slurry are temporarily stored are discharged at discharge port (250), then applied on the current collector (110). In this case, the binder composition (131) is applied on the top surface of the current collector (110) to form the binder layer (130), and the electrode slurry (121) is applied on the top surface of the binder layer (130) to form the electrode active material layer (120).

The current collector (110) is consecutively transported by the conveyor (300). The current collector of which the binder layer (130) and the electrode active material layer (120) are formed is transported to a dryer (not shown), and rolled by passing through a roller (not shown), then go through the notching process to produce an electrode.

On the other hand, referring to FIGS. 8 to 9, shim members (240) may be disposed between each dies to form the first discharge port (251) and the second discharge port (252). More specifically, the first shim member (241) may be disposed between the upper die (210) and the intermediate die (220) and the second shim member (242) may be disposed between the intermediate die (220) and the lower die (230).

The first shim member (241) includes a hollow in communication with the manifold on a plate in the same size with the interior surface of the upper die (210) and the intermediate die (220), and has one side opened to discharge the electrode slurry. The opening part acts as a discharge port when assembling the electrode.

The second shim member (242) includes a hollow in communication with the manifold on a plate in the same size with the interior surface of the intermediate die (220) and the lower die (230), and has one side opened to discharge the binder composition. The opening part acts as a discharge port when assembling the slot die.

On the other hand, because said first shim member (241) and said second shim member (242) provided between the dies form a discharge port (250), the shape of the first shim member (241) and the second shim member (242) should be adjusted as per the pattern to be applied.

Specifically, the hollow formed in the first shim member (241) has the same shape as the manifold to apply the electrode slurry at the center of the current collector. However, the hollow in the second shim member (242) has a wall at the center to apply the binder composition to the both ends of the electrode slurry. In addition, since the binder composition is applied in two rows with different width direction lengths on the current collector, one of the width direction lengths of the hollows separated by the walls in the second shim member (242) may be formed shorter than another width direction length.

In addition, since the thickness of the shim member determines the thickness of material to be applied, the thickness of the first shim member (241) related to the discharge of the electrode slurry may be thicker than the thickness of the second shim member (242) related to the discharge of the binder composition.

As described above, in order to prevent steps forming on the surface of the electrode, the thickness of the electrode active material layer can be as thin as the thickness of the binder layer to make the sum of the thickness of the electrode active material layer and the binder layer at both ends of the current collector can be the same with the thickness of the electrode active material layer in which the binder layer is not formed. In this case, the thickness of the electrode slurry (121) can be decreased by setting the thickness at the ends of the width direction length of the discharge port as thin as the thickness of the center part which excludes the thickness of the binder composition to be applied As described above, the step of applying the binder composition and the step of forming the electrode slurry may be simultaneously performed by one slot die or consecutively performed by two slot dies.

FIG. 10 is a schematic diagram showing an application process of the binder composition and electrode slurry of the manufacturing method of the electrode according to the other embodiment of the present invention. FIG. 11 is schematic diagram illustrating a structure of slot die used in the manufacturing method of the electrode according to the other embodiment of the invention.

Referring to FIG. 10, the slot die (400) consists of the first slot die (410) discharging the electrode slurry (121) and the second slot die (420) discharging the binder composition (131). Specifically, the second slot die (420) is located on the upstream point of the coating process direction and apply the binder composition (131) on the top surface of the current collector (111). Continuously, the first slot die (410) located at the downstream direction of the second slot die (420) applies the electrode slurry (121) to the current collector (110) to which the binder composition (131) is applied and forms the binder layer (130) and the electrode active material layer (120) on the current collector (111).

In addition, the current collector (110) can be supported and transported by the conveyor (300). The current collector (110) applied with the binder composition (131) and the electrode slurry (121) is dried and rolled in order by passing through the drier (not shown) and the roller (not shown), then notched to prepare an electrode.

Referring to FIG. 11, each of the first slot die (410) and the second slot die (420) has separate discharge port through which the electrode slurry and binder composition can be discharged. The first slot die (410) consists of the upper die (411) and the lower die (412), and the first shim member (241) is provided between the upper die (411) and the lower die (412) to form a discharge port where the electrode slurry (121) can be discharged. Accordingly, the second slot die (420) consists of the upper die (421) and the lower die (422), and the second shim member (242) is provided between the upper die (421) and the lower die (422) to form a discharge port where the binder composition (131) can be discharged. Information related to the first shim member and the second shim member is as described above.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

In the present specification, terms indicating upward, downward, leftward, rightward, forward, and backward directions are used, but these terms are for convenience of explanation only and may vary depending on the position of an object or the position of an observer It will be apparent to those skilled in the art that the present invention is not limited thereto.

DESCRIPTION OF REFERENCE NUMERALS

100: electrode
1, 110: current collector
2, 120: electrode active material layer
111: electrode tab
121: electrode slurry
130: binder layer
131: binder composition
140: non-coated part
200, 400: slot die
210, 411, 421: upper die
220: intermediate die
230, 411, 422: lower die
240: shim member
241: first shim member
242: second shim member
250: discharge port
251: first discharge port
252: second discharge port
300: conveyor
410: first slot die
420: second slot die

The invention claimed is:

1. An electrode comprising:
a current collector,
an electrode active material layer disposed on the current collector,
an electrode tab formed at one end of the current collector, and
binder layers disposed between the current collector and the electrode active material layer at only both ends of the electrode active material layer,
wherein a length of one of the binder layers in a width direction is smaller than a length of another binder layer in a width direction,
the current collector includes a non-coated part on the both ends on which the binder layers are not disposed,
the electrode tab is formed on the non-coated part of the current collector at adjacent to one of the binder layers with a shorter length in the width direction.

2. The electrode of claim 1, wherein the binder layers includes 60 to 90 wt % of a binder and 10 to 40 wt % of a conductive material based on a total weight of the binder layers.

3. The electrode of claim 2, wherein the binder comprises a water-insoluble polymer selected from the group consisting of polyvinylidene fluoride (PVDF), polyvinylidene chloride (PVDC), polyacrylonitrile (PAN), polypropylene oxide (PPO), polyethylene oxide-propylene oxide copolymer (PEO-PPO), polytetrafluoroethylene (PTFE), polyimide (PI), polyetherimide (PEI), stylenebutadiene rubber (SBR), polyacrylate, and combinations thereof.

4. The electrode of claim 2, wherein the binder comprises an aqueous polymer selected from the group consisting of carboxymethyl cellulose (CMC), methyl cellulose (MC), cellulose acetate cellulose (CAP), hydroxypropyl methyl cellulose (HPMC), hydroxypropyl methyl cellulose phthalate (HPMCP), and combinations thereof.

5. The electrode of claim 2, wherein the conductive material comprises graphite carbon black, conductive fibers, metal powders, conductive whiskey, conductive metal oxides, and conductive materials.

6. The electrode of claim 1, wherein a thickness of the binder layers is 1 to 30% of a thickness of the electrode active material layer disposed directly on the current collector.

7. The electrode of claim 6, wherein a sum of a thickness of the electrode active material layer disposed on the binder layers and the thickness of the binder layers at the both ends of the current collector is the same as the thickness of the electrode active material layer directly disposed on the current collector.

8. The electrode of claim 1, wherein a length of the binder layers in a width direction formed at one end of the current collector is 5 to 20% of a length of the electrode active material layer in the width direction.

9. A secondary battery comprising the electrode of claim 1.

10. The electrode of claim 1, wherein the binder layers includes 70 to 80 wt % of a binder.

11. A method of manufacturing an electrode comprising:
forming binder layers in two rows on both ends of a current collector by applying a composition including a binder;
forming an electrode active material layer on the current collector and the binder layers by applying an electrode slurry including an electrode active material so that the current collector is completely covered with the electrode active material layer and the binder layers;
drying the current collector where the binder layers and the electrode active material layer is formed; and
forming an electrode tab at one end of the current collector by notching the dried current collector,
the binder layers partially disposed between the current collector and the electrode active material layer at only both ends of the electrode active material layer,
wherein a length of one of the binder layers in a width direction is smaller than a length of another binder layer in a width direction,
the current collector includes a non-coated part on the both ends on which the binder layers are not disposed,
the electrode tab is formed on the non-coated part of the current collector at adjacent to one of the binder layers with a shorter length in the width direction.

12. The method of manufacturing electrode of claim 11, wherein the forming the binder layers and forming the active material layer are simultaneously conducted by one coating die.

13. The method of manufacturing electrode of claim 11, wherein the forming the binder layers and forming the active material layer are conducted consecutively by two coating dies.

14. A method of manufacturing secondary battery comprising the method of manufacturing electrode of claim 11.

15. The method of manufacturing electrode of claim 11, wherein the binder layers with a longer length is notched to the same length of another one among the binder layers in two rows of the current collector in the step of forming the electrode.

* * * * *